United States Patent
Dodworth

(10) Patent No.: US 8,591,781 B2
(45) Date of Patent: Nov. 26, 2013

(54) MOULDED PRODUCT AND METHOD OF PRODUCING IT

(75) Inventor: Antony Dodworth, Lincolnshire (GB)

(73) Assignee: Bentley Motors Limited (GB)

( * ) Notice: Subject to any disclaimer, the term of this patent is extended or adjusted under 35 U.S.C. 154(b) by 862 days.

(21) Appl. No.: 12/515,307

(22) PCT Filed: Nov. 16, 2007

(86) PCT No.: PCT/GB2007/004392
§ 371 (c)(1),
(2), (4) Date: Dec. 23, 2009

(87) PCT Pub. No.: WO2008/059273
PCT Pub. Date: May 22, 2008

(65) Prior Publication Data
US 2010/0098944 A1    Apr. 22, 2010

(30) Foreign Application Priority Data

Nov. 18, 2006 (GB) .................................. 0623047.8

(51) Int. Cl.
*B29C 47/76* (2006.01)
*B29C 47/00* (2006.01)
*B29C 67/00* (2006.01)
*B28B 11/16* (2006.01)
*H05B 7/00* (2006.01)

(52) U.S. Cl.
USPC ........... 264/145; 264/101; 264/102; 264/108; 264/136; 264/484

(58) Field of Classification Search
USPC .................. 264/101, 102, 108, 135, 145, 484
See application file for complete search history.

(56) References Cited

U.S. PATENT DOCUMENTS

| 5,229,052 A * | 7/1993 | Billiu ............................ 264/115 |
| 5,352,517 A * | 10/1994 | Clough et al. ................ 428/357 |
| 2010/0116795 A1 * | 5/2010 | Dodworth ................ 219/121.67 |

FOREIGN PATENT DOCUMENTS

| EP | 0851142 | 7/1998 |
| JP | 50-023473 | 3/1975 |
| JP | 57-039272 | 3/1982 |
| JP | 02-058914 | 4/1990 |
| JP | 05-016251 | 1/1993 |
| JP | 2002-506754 | 3/2002 |
| JP | 2004-237535 | 8/2004 |
| WO | 9112944 | 9/1991 |
| WO | 2005030462 | 4/2005 |

* cited by examiner

*Primary Examiner* — Jennifer Chriss
*Assistant Examiner* — Camie Thompson
(74) *Attorney, Agent, or Firm* — Salter & Michaelson

(57) ABSTRACT

In a method of producing a molded product, fiber such as carbon fiber is supplied to a robot delivery head where it is cut into shorter lengths and delivered to a molding tool in a desired orientation and in a desired number of layers to achieve a desired thickness and strength. Resin is then applied to the aligned fibers and cured to form the product. Alignment or substantial alignment of fiber is maintained by applying vacuum to the mold, by electrostatic means, or by coating the fiber with resin prior to application to the molding tool and heating the molding tool surface, or by coating or impregnating the fiber with a ferric powder and magnetizing the molding tool, or by applying a mist layer of epoxy in front of the shortened lengths of fibers. Fiber lengths and deposition rates are varied as required. The method facilitates fully automated production reducing process time and component costs. The invention also comprises a corresponding molded product.

24 Claims, 4 Drawing Sheets

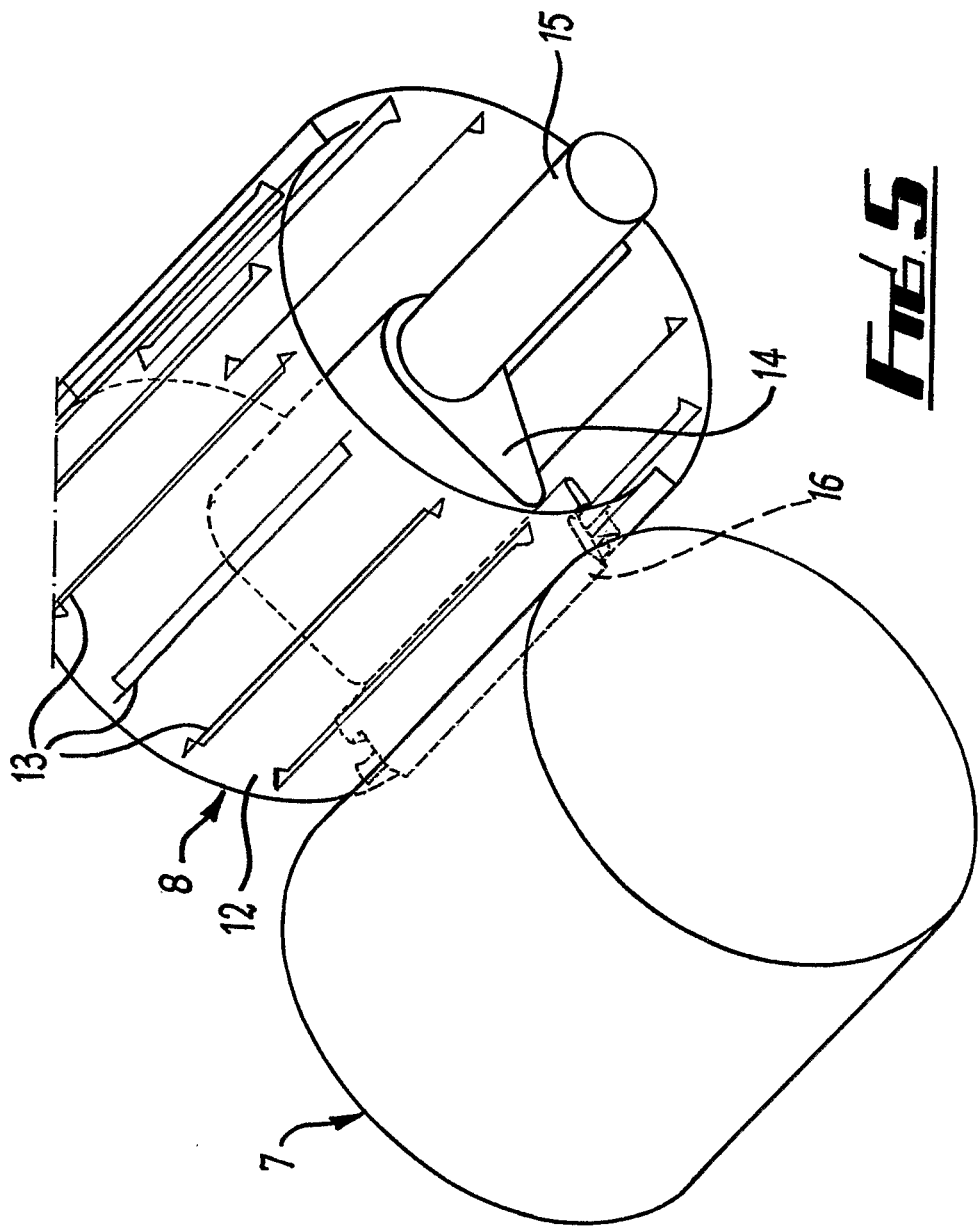

MOULDED PRODUCT AND METHOD OF PRODUCING IT

TECHNICAL FIELD

The present invention relates to a method of producing a moulded product.

BACKGROUND OF THE INVENTION

The method is particularly, but not exclusively, for use in the production of a structural product. Such products may, for example, be structural components for use in the automobile or other industries. The material to be used in the method is advantageously carbon fibre, but other suitable fibres may be used. Carbon fibre has the advantage that it combines high strength with light weight. In a known method for producing structural components, a carbon fibre matt is produced. This matt comprises a multiplicity of carbon fibres aligned in the direction in which the maximum strength of the component is desired. The matt may be woven or non-woven. In the former, wefts maintain fibre warps aligned and in the latter the aligned fibres may be maintained in position by transverse extending fibres wrapped around the aligned fibres. The carbon fibre matt so produced, or "pre-preg" as it is sometimes called, is cut to the desired shape and then laid in the moulding tool. Resin is then applied and subsequently cured to produce the moulded product to the desired shape. The initial step of producing the matt and then cutting to shape is wasteful in time, energy and materials. It is an object of the invention to eliminate or mitigate these disadvantages.

SUMMARY OF THE INVENTION

According to one aspect of the present invention there is provided a method of producing a moulded product including the steps of supplying fibre to a robot delivery head, cutting/shearing the supplied fibres in lengths, delivering the predefined shortened lengths of fibre to a moulding tool so that the fibres are aligned or substantially aligned in a desired direction, and required number of layers to establish the designed thickness and strength, applying resin to the aligned fibres and curing the resin to form the moulded product.

According to another aspect of the invention, there is provided a moulded product comprising fibres cut to a shortened length which are aligned or substantially aligned in the same direction and coated with a cured resin.

In a preferred embodiment of the invention, a continuous length of fibre is cut/sheared into shorter lengths and covered, advantageously fully encased and bonded together by resin.

The length of the shortened fibres may vary between 10 mm and 120 mm. Preferred shortened lengths are 14 mm, 28 mm, 58 mm and 115 mm.

The amount of fibre applied per unit area may vary between 400 and 4000 grams per square meter (gsm). Preferred rates are 1500 gsm and 2500 gsm. These preferred fibre lengths and deposition rates are based on present equipment, but may be changed to suit any given application.

This facilitates fully automated production reducing process time and component costs. In order to maintain the shortened fibres aligned or substantially aligned, the moulding tool surface is partially evacuated to retain the fibres in the desired orientation.

Alternatively, where the fibre is carbon fibre it may be electro-statically charged and the moulding tool surface earthed so that mutual attraction occurs.

In another alternative, the carbon fibre may be impregnated or coated with ferric powder and the moulding tool surface effectively (electro) magnetized.

In a further alternative, the carbon fibre may be coated with a compatible crystalline epoxy powder and the moulding tool surface heated so that on deposition, the carbon fibre is retained at the surface and the process of moulding started prior to the full application and curing of the bonding resin.

In a still further alternative, using the same robot that cuts/shears, distributes and aligns the carbon fibre, a mist layer of compatible epoxy is applied in front of the shortened lengths of deposited carbon fibre. It is then retained at the surface and the moulding process started prior to the full application and curing of the bonding resin.

DESCRIPTION OF THE DRAWINGS

In order that the invention may be more fully understood, one embodiment thereof will now be described, by way of example, with reference to the accompanying drawings, in which:—

FIG. 5 is a perspective view to a larger scale of part of the apparatus of FIGS. 3 and 4.

DETAILED DESCRIPTION

Figure 1:
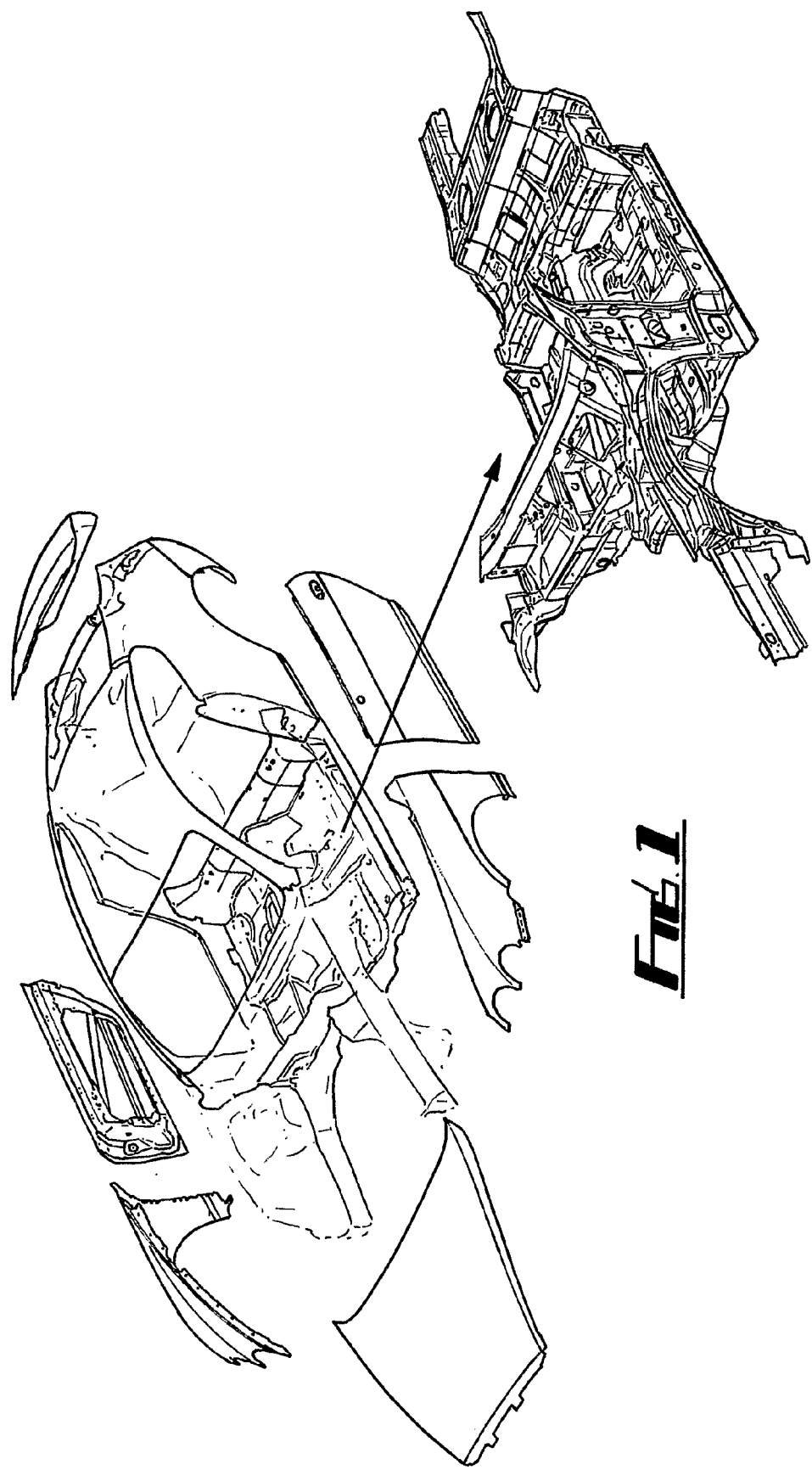
FIG. 1 diagrammatically shows a floor pan/platform for an automobile.

Referring to the drawings, one embodiment of the method will now be described in relation to the production of a moulded structural composite floor pan for an automobile. Such a floor pan 1 is illustrated in FIG. 1 and as can be seen has a complex shape. In use, a continuous length of carbon fibre (not shown) is fed to a robot head at which it is cut/sheared into predetermined lengths, aligned and sprayed into a moulding tool.

The position and angle of the head in relation to the moulding tool cavity may be varied as desired so that the individual shortened fibres are laid in the moulding tool cavity at the desired position and to the desired density and thickness. The fibres are preferably substantially aligned although full alignment is not necessary to achieve significant strength.

However, the desired strength of the moulded product may be optimized by spraying different lengths of shortened fibre or modifying the fibre alignment for additional layers.

Figure 2:
FIG. 2 shows a section of aligned fibres produced during the method for producing the floor pan.

FIG. 2 diagrammatically shows a layer 30 of fibres 31 in a moulding tool.

In order to maintain the fibres in the correct position in the moulding tool, the surface is partially evacuated. Mechanical methods work with long fibres and fibre alignment reduces tow size effects. Increasing alignment enables the reduction of deposition rates which in turn leads to both process and cost savings.

Following deposition of the fibres in the mould, the fibres are covered and fully encased with a layer of curable resin, preferably epoxy. The resin is substantially cured and the finished product removed from the mould. As compared with existing moulding methods firing individual fibres into the mould and subsequently coating them with resin has a number of advantages. In conventional moulding methods a piece of material made of carbon fibre is first produced. This material may be woven or non woven but in either case it is necessary to cut the material, usually using an existing pattern before placing it in and fitting it to the moulding tool. This dual step of first of all producing a piece of woven/non-woven material and then subsequently cutting it to a desired shape is wasteful not only in time and effort but also in material waste. Both of these steps are effectively eliminated in the method of the invention. This can lead to a reduction in material wastage approaching 40%.

In the above described method of the invention the length of the cut/sheared fibres can be varied as desired. Exemplary fibre lengths are 115 mm, 58 mm, 28 mm and 14 mm. The superficial fibre density may also be chosen as desired. Exemplary fibre densities are 1500 gsm (grams per square meter) and 2500 gsm.

Although, as already stated, non-precise alignment may not have a significant effect on strength, directionality is important. The limits for levels of directionality can be determined by testing. Directionality levels are dependant upon processing speed and deposition rates can be determined for different levels of directionality.

Tests may be carried out on products made in accordance with the above process to determine:—
 Effect of fibre length, and combination of fibre lengths;
 Effect of filamentisation;
 Effect of fibre alignment.
 Maximum attainable directionality with respect to fibre length;
 Maximum attainable directionality with respect to mass per unit area;
 Volume fraction with respect to fibre length;
 Volume fraction with respect to filamentisation;
Volume fraction with respect to density per unit area (effect of nesting).

Figure 3:
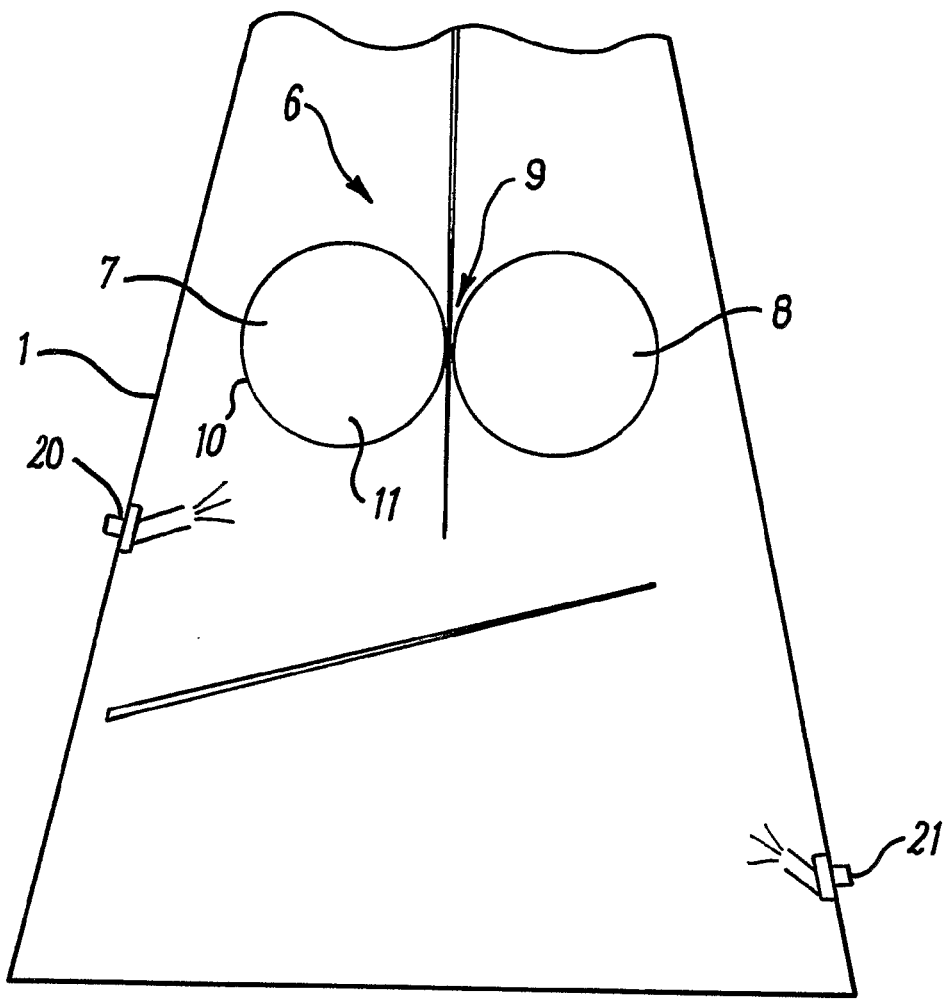
FIG. 3 shows a diagrammatic side elevation view in section of one form of the apparatus according to the invention. For simplicity only one set of air outlet jets are shown and in the correct relationship relative to the motion of the robot head.
Figure 4:
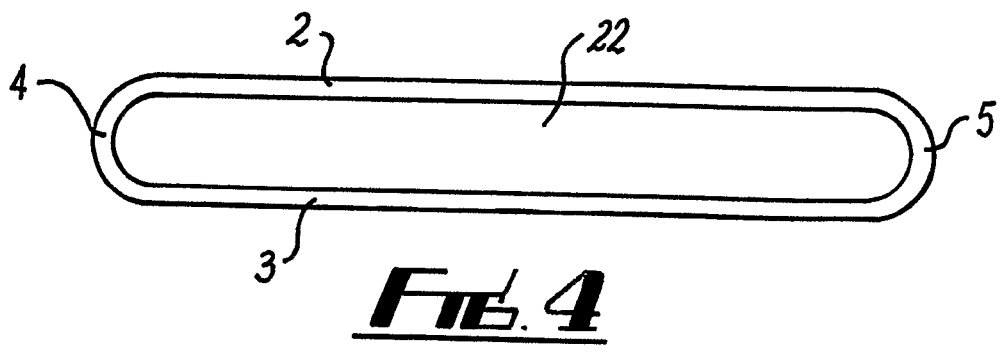
FIG. 4 is a diagrammatic underplan view of the apparatus.

Apparatus for aligning the fibre will now be described with reference to FIGS. 3 to 5 of the drawings. Referring specifically to FIGS. 3 and 4, which for simplicity show the delivery slot in the lowest vertical position, the apparatus comprises a housing 1. This has a downwardly divergent shape in side elevation and a lozenge shape in cross section (as can be seen from FIG. 4). The proportions of the housing 1 contribute to the consistent and smooth distribution of shortened fibres. The lozenge shape outlet/delivery slot in cross section (as shown in FIG. 4) determines the principal alignment of the alignment of the shortened fibres when deposited into the moulding tool. The lozenge shape comprises two parallel sides 2 and 3 joined at opposite ends respectively by semi-circular portions 4 and 5. A cutting/shearing head 6 is disposed within the housing 1. The head 6 comprises two rollers 7 and 8 defining a nip 9 therebetween.

Roller 7 is a pressure roller and comprises a cylindrical tyre 10 mounted on a cylindrical support 11. The tyre is made of rubber or other suitable material. Roller 8 is a blade housing roller. This comprises a cylindrical housing 12. Blades are retained in the blade housing roller 8 which is made from hard but resilient material such as rubber The diameter of the two rollers 7 and 8 is the same. Housing 12 is formed with a number of through elongate slots 13 extending axially of the cylinder of the housing and disposed at circumferentially spaced intervals around the cylinder. Disposed within the housing 12 is a cam 14 mounted on a camshaft 15 via splines (not shown). The camshaft is disposed to be driven by a stepper motor (not shown) at one of a range of speeds.

A plurality of blades 16 (only one shown) is associated with respective slots 13, and are disposed to be extended through their corresponding slots 13 sequentially by the action of the cam as it is rotated within the housing 8 by means of the camshaft 15 driven by the stepper motor in order to cut/shear fibre passing through the nip formed between the rollers 7 and 8. When the cam has passed each blade the resilience of the rubber of the housing 8 allows that blade to return to its retracted inoperative position. In this particular case there are sixteen slots 13 disposed at 22.5 degree intervals around the circumference of the housing 8 and sixteen blades respectively associated therewith. However, the number of slots 13 and blades 16 may be varied as desired. The cam lift provided by the cam 14 is circa 2 to 3 mm but again this may be varied as desired. The diameter of the rollers 7 and 8 is circa 30 mm but this may also be varied as desired. In this particular example the cam has a single lobe but multi lobe cam may be used if shorter fibre lengths are desired.

Typically for fibres that are circa 1 mm thick the cam lift for the cutting blade must be sufficient to cut through the fibre and have accommodation of circa 0.2 mm in the pressure roller (7).

The centres of rotation for rollers (7) and (8) can be adjusted so that the nip on the chosen fibre diameter is adequate to ensure consistency and meet the cutting control criteria described above.

In operation the rollers 7 and 8 are driven at the same speed which is independent of the camshaft speed. The circumferential speed of the surfaces of the rollers determines the rate of feed of fibre fed through them. By altering the speed of the stepper motor driving the camshaft 15 relative to the speed of the rollers 7 and 8, the precise length of fibre fed between the rollers and cut/sheared by the cam actuated blades extending through their corresponding slots is determined. As the fibre is cut/sheared, the rollers 7 and 8 project the shortened lengths towards the delivery slot. In the particular orientation shown where the slot is in a lower position than the rollers 7 and 8 gravity will also assist. However, the slot could be higher than the rollers 7 and 8. Shortened fibres produced by the cutting/shearing rollers 7 and 8 fall under gravity towards the base of the housing under the action of gravity. Their passage is influenced by air jets emanating from four air jet apertures extending through the wall of the housing 1 and arranged in two pairs 20 and 21 disposed respectively in the upper and lower parts of the housing 1. Only one aperture of each pair is shown. Apertures 20 are disposed slightly below the level at which the shortened lengths of fibre are projected from between the rollers 7 and 8. The air jets through apertures 20 are activated as trailing elements relative to the movement of the robot head and the air jets through the apertures 21 are activated on the leading face of motion. The purpose of the air jets through apertures 20 is to spread the lengths of fibre. This spreading action starts whilst the fibres are still partially retained by the rollers and prior to them being cut and free from the roller nip and projected towards the delivery slot. Apertures 21 are disposed at a lower level than apertures 20. The purpose of the air jets through apertures 21 is to rotate and align the shortened lengths of fibre to the direction of and within an outlet slot 22 which is defined between parallel walls 2 and 3. The size of slot 22, the distance between the rollers 7 and 8 and the slot 22, and the air pressure of the jets through the apertures 20 and 21 are adjusted to suit the fibre length and optimize the desired fibre distribution.

It will be appreciated that the above embodiments has been described by way of example only and that many variations are possible within the scope of the invention. Alternatives to vacuum may be employed to maintain the shortened fibres aligned or substantially aligned. For example, carbon fibre may be electro-statically charged and the moulding tool surface earthed so that mutual attraction occurs.

In another alternative, the carbon fibre may be impregnated or coated with ferric powder and the moulding tool surface (electro) magnetized.

In a further alternative, the carbon fibre may be coated with a compatible crystalline epoxy powder and the moulding tool surface heated so that on deposition, the carbon fibre is retained at the surface and the mould integration started prior to the full application and curing of the bonding resin.

In a still further alternative, using the same robot that cuts/shears, distributes and aligns the carbon fibre, a mist layer of compatible epoxy is applied in front of the shortened lengths of deposited carbon fibre. It is then retained at the surface and the moulding process started prior to the full application and curing of the bonding resin.

What is claimed is:

1. A method of producing a moulded product including the steps of supplying fibre to a robot delivery head, cutting/shearing the supplied fibres in lengths, delivering the predefined shortened lengths of fibre to a moulding tool, applying resin to the lengths of fibre and curing the resin to form the product, wherein at least one air jet is used to rotate and align the lengths of fibre to the direction of and within an outlet slot defined by parallel walls, such that the lengths of fibre are delivered aligned in a same direction to the moulding tool to form each of a required number of layers to establish the designed thickness and strength.

2. A method of producing a moulded product as claimed in claim 1, in which a continuous length of fibre is cut into shorter lengths.

3. A method of producing a moulded product as claimed in claim 2, in which the resin is applied so as to cover the shorter lengths of fibre.

4. A method of producing a moulded product as claimed in claim 3, in which the covering of resin fully encases and bonds together the shorter lengths of fibre.

5. A method of producing a moulded product as claimed in claim 1, in which the moulding tool surface is partially evacuated in order to maintain the shortened fibres aligned or substantially aligned.

6. A method of producing a moulded product as claimed in claim 1, in which the fibres are carbon fibres and the fibres and surface of the moulding tool are electrostatically charged to create an attraction between them.

7. A method of producing a moulded product as claimed in claim 1, in which the fibres are impregnated or coated with magnetic material and the moulding tool is magnetized to attract the material coated fibres.

8. A method of producing a moulded product as claimed in claim 7, in which the magnetic material is ferric powder.

9. A method of producing a moulded product as claimed in claim 1, in which the fibres are coated with an epoxy powder and the moulding tool surface is heated so that on deposition the fibre is retained on the moulding tool.

10. A method of producing a moulded product as claimed in claim 1, in which a mist layer of epoxy is applied to the shortened fibres so that the fibres are retained on the moulding tool surface on contacting that surface.

11. A method of producing a moulded product as claimed in claim 1, in which the shortened fibres are between 10 mm and 120 mm in length.

12. A method of producing a moulded product as claimed in claim 1, in which the amount of fibre applied is between 400 and 4000 grams per square meter.

13. A method of producing a moulded product as claimed in claim 1, including disposing plural air jets to rotate and align the lengths of fibre.

14. A method of producing a moulded product as claimed in claim 13 including disposing two pairs of air jets respectively at upper and lower positions.

15. A method of producing a moulded product as claimed in claim 1 in which the direction of aligned fibre delivery to the moulding tool is modified for each successive layer in said required number of layers.

16. An apparatus for producing a moulded product comprising a robot delivery head for delivering predefined shortened lengths of fibre to a moulding tool, the delivery head comprising a housing having an outlet slot defined by parallel walls, a pair of rollers disposed in the housing and through which the fibres pass, and at least one air jet disposed between the rollers and outlet slot and operable to rotate and align the lengths of fibre to the direction of and within the outlet slot such that the lengths of fibre are delivered aligned in a same direction to the moulding tool to form each of a required number of layers to establish a predefined thickness and strength.

17. An apparatus for producing a moulded product as claimed in claim 16 including a plurality air jets to rotate and align the lengths of fibre.

18. An apparatus for producing a moulded product as claimed in claim 17 including two pairs of air jets.

19. An apparatus for producing a moulded product as claimed in claim 18 wherein the two pairs of air jets are disposed respectively at upper and lower positions of the housing.

20. An apparatus for producing a moulded product as claimed in claim 19 wherein the outlet slot is at the bottom of the housing so that gravity will assist.

21. A method of producing a moulded product including the steps of supplying fibre to a robot delivery head, cutting the supplied fibres in lengths, delivering the predefined shortened lengths of fibre to a moulding tool so that the fibres are aligned in a desired direction and required number of layers to establish the designed thickness and strength of the moulded product, applying resin to the lengths of cut fibres and curing the resin to form the product, wherein at least one air jet is used to rotate and align the lengths of fibre to the direction of and within an outlet slot, such that the lengths of fibre are delivered to the moulding tool substantially aligned in a same direction to form the required number of layers to establish the designed thickness and strength.

22. An apparatus for producing a moulded product comprising a robot delivery head for delivering predefined shortened lengths of fibre to a moulding tool, the delivery head comprising a housing having an outlet slot, a pair of rollers disposed in the housing and through which the fibres pass, and at least one air jet disposed between the rollers and outlet slot and operable to rotate and align the lengths of fibre to be substantially aligned in a same direction within the outlet slot such that the lengths of fibre are delivered to the moulding tool aligned in a desired direction to form a required number of layers to establish a predefined thickness and strength.

23. An apparatus for producing a moulded product as claimed in claim 22 wherein housing has opposed tapered portions widening from the rollers to the outlet slot and the outlet slot is defined by parallel walls.

24. An apparatus for producing a moulded product as claimed in claim 22 including at least two air jets disposed respectively at upper and lower positions of the housing, and each directed angularly with a component of the air stream directed opposite to the direction of fibre flow.

* * * * *